United States Patent [19]
Wilkinson

[11] Patent Number: 4,711,579
[45] Date of Patent: Dec. 8, 1987

[54] SYSTEM FOR AUTOMATICALLY INSPECTING A FLAT WORKPIECE FOR HOLES

[75] Inventor: Blair E. Wilkinson, El Toro, Calif.

[73] Assignees: H. Fred Johnston; Carl Grosso, both of Santa Ana, Calif.

[21] Appl. No.: 895,644

[22] Filed: Aug. 12, 1986

[51] Int. Cl.$^4$ .......................................... G01B 11/14
[52] U.S. Cl. .................................. 356/375; 356/394; 356/398; 250/560; 250/561
[58] Field of Search ............... 356/375, 376, 394, 398, 356/237; 250/560, 561

[56] References Cited

U.S. PATENT DOCUMENTS

| | | | |
|---|---|---|---|
| 3,291,994 | 12/1966 | Romeo et al. | 250/561 |
| 4,105,925 | 8/1978 | Rossol et al. | 250/561 |
| 4,360,274 | 11/1982 | Norton-Wayne | 356/398 X |

Primary Examiner—Eugene R. LaRoche
Assistant Examiner—David Mis
Attorney, Agent, or Firm—Morland C. Fischer

[57] ABSTRACT

An inspection system for automatically documenting and verifying the position and dimensions of holes in a flat sheet metal workpiece. The system includes a transparent, light diffusing inspection table upon which the workpiece is laid. A ball screw-driven yoke travels continuously along the inspection table in the Y direction and includes a bottom bar for positioning a source of illumination below the table and a top bar for positioning a plurality of optical sensor arrays above the table. The optical sensor arrays are responsive to the presence (or absence) of light energy which is diffused by the table. A detector is interconnected to the sensor arrays to detect light-to-dark and dark-to-light transitions which are representative of the edge of a hole. The transition data is read and stored in a microcomputer for subsequent display and/or print out. Circuitry is provided to multiplex the optical sensor arrays so that each pixel thereof is sequentially read in order to provide data corresponding to hole locations in the X direction across the table. The position of the yoke along the ball screw provides data corresponding to hole locations in the Y direction.

20 Claims, 6 Drawing Figures

SYSTEM FOR AUTOMATICALLY INSPECTING A FLAT WORKPIECE FOR HOLES

BACKGROUND OF THE INVENTION

1. FIELD OF THE INVENTION

This invention relates generally to an automatic electro-optical inspection system and, more particularly, to a system including a unique inspection table and a movable yoke which is adapted to ride along the table to automatically document and verify the position and dimensions of holes made in a flat sheet metal workpiece.

2. PRIOR ART

It has been common to manually inspect punched, flat sheet metal workpieces. The conventional manual inspection technique involves using a height gauge, catipers and/or a tape to verify the dimensions of each hole or the position of a hole relative to an edge of the workpiece. Where a multitude of holes may be involved in a large number of workpieces, it becomes a laborious and time consuming task for one or more workmen to manually inspect each hole and provide a record of the inspection results.

Accordingly, automatic electro-optical inspection systems have been proposed to increase the efficiency and lower the cost of inspecting the holes in a flat workpiece. However, such automatic systems usually involve the complex movement of the workpiece. More particularly, a pair of motors and associated position monitoring apparatus are frequently used to either rotate the workpiece or move the workpiece in each of a pair of perpendicular directions. Such a system is generally slow and expensive and requires relative lengthy calculations to document and verify the size and location of the hole.

Examples of known systems for inspecting holes in a flat workpiece are available in one or more of the following U.S. Pat. Nos. 2,684,009, July 20, 1954, 4,319,272, Mar. 9, 1982, 4,555,798 Nov. 26, 1985 4,560,273, Dec. 24, 1985.

SUMMARY OF THE INVENTION

Briefly, and in general terms, an economical and reliable inspection system is disclosed for automatically documenting and verifying the position and dimensions of all holes in a flat sheet metal workpiece. The present system provides an accurate, high speed improvement over the time consuming and laborious manual technique which has heretofor been used for inspecting the holes in a workpiece. The present inspection system comprises an inspection table having a top formed from a light diffusing, transparent material upon which the workpiece is placed. A ball screw-driven yoke is mounted for continuous movement in the Y direction across the table. The yoke includes oppositely aligned top and bottom bars for supporting and positioning a source of illumination below the table top and a plurality of optical sensor arrays above the table top. The optical sensor arrays are arranged to inspect a complete linear scan line in the X direction across the table.

Each optical sensor array is located at a detector interface. The detector interfaces include respective multiphase clock logic to generate multiphase clock signals for sequentially accessing the pixels (e.g. charged coupled devices) thereof. A video interface is provided for multiplexing the output signals from the plurality of optical sensor arrays so that each of the pixels thereof can be successively read by a microcomputer. The optical sensor arrays are responsive to light energy which is diffused upwardly through the transparent table top. Means are interconnected with the sensor arrays to detect light-to-dark and dark-to-light transitions in the workpiece. Each such transition is representative of the edge of a hole. The transition data is supplied by way of a computer interface to the microcomputer where it is read and stored for subsequent display and/or read out.

The computer interface includes counting means which maintains a serial count corresponding to each one of the pixels which is successively read from the sensor arrays. The computer interface also includes circuitry that is triggered by the occurrence of each light-to-dark or dark-to-light transition in the workpiece. Upon the detection of such a transition, the triggering circuitry generates an interrupt signal to cause the microcomputer to read the count of the counter and thereby identify a particular pixel at the time of such transition. By reading the corresponding pixels during the occurrence of a light-to-dark or dark-to-light transition, the microcomputer is provided with compressed data relating to hole locations in the X direction across the table. By sensing the location of the movable yoke, the microcomputer is provided with data relating to hole locations in the Y direction.

The inspection system also comprises an operator's console at which the microcomputer, a video screen, a printer, control switches and indicator lights are located. The video screen may have a touch screen capability and is adapted to display status and various modes of operation from which the operator may select. The output of the present inspection system is a list in X and Y coordinates of the center points of the holes relative to one corner of the workpiece, the outside edges of the workpiece, and the maximum width and length of each hole. A plot of the workpiece may also be drawn with all hole and workpiece dimensions illustrated.

DESCRIPTION OF THE PREFERRED EMBODIMENT

Figure 1:
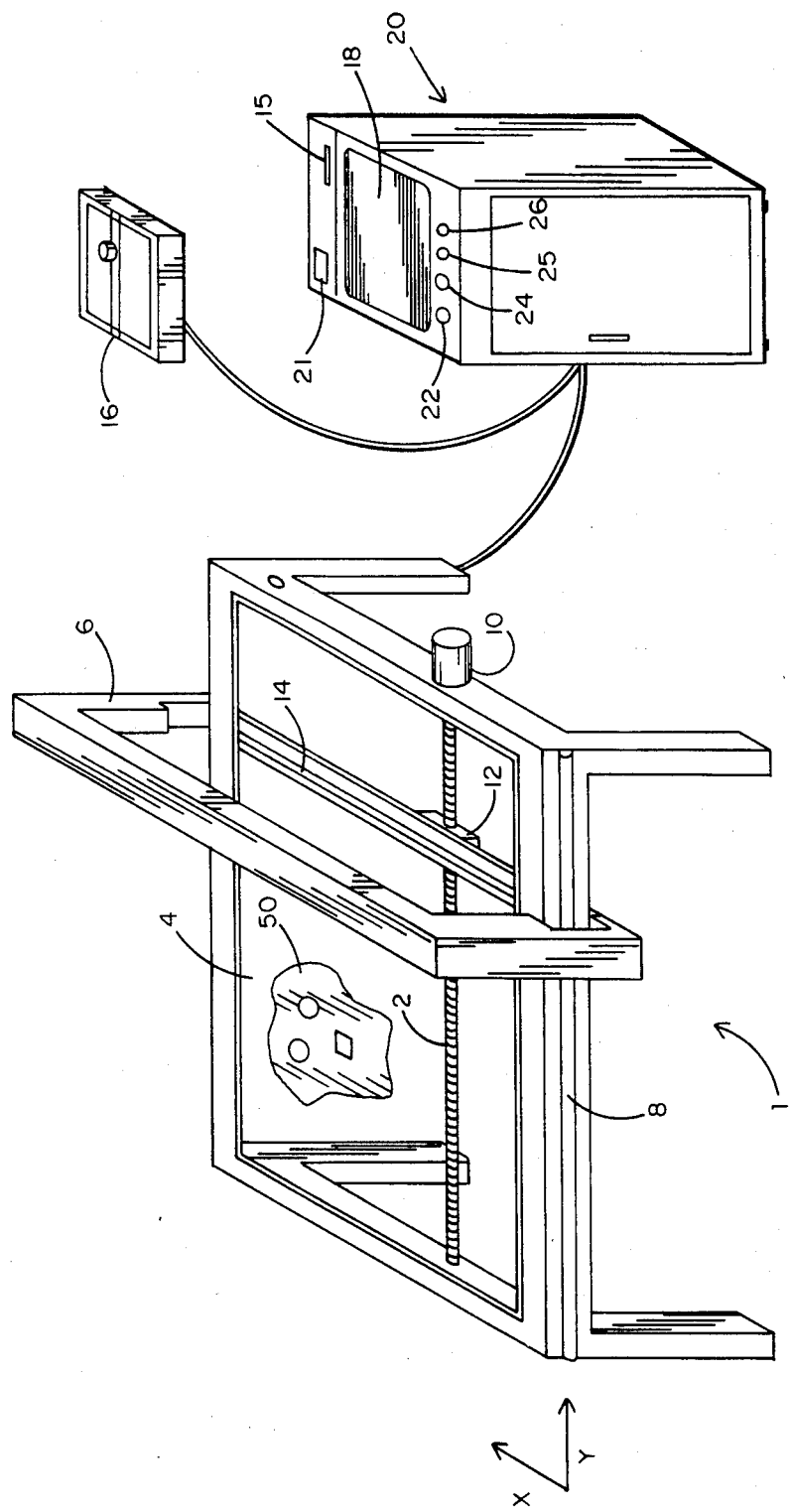
FIG. 1 is a perspective view showing the automatic inspection system which forms the present invention.

The automatic inspection system of the present invention for sensing the position and dimensions of holes in a metal workpiece is best described while referring to the drawings. In FIG. 1, there is shown an inspection table 1 upon which a workpiece 50 is laid. In the present invention, the inspection table 1 functions as the mounting point for all of the soon-to-be described static and dynamic components of the inspection system. By way of example only, inspection table 1 is fabricated from heavy steel. The top 4 of table 1 is formed from a clear, light diffusing sheet of (0.5 inch thick) plastic, or the like, such as that known commercially as Lexan with a sheet of glass being placed thereover to prevent the table top 4 from incurring scratches and other possible surface damage. The table top 4 is dimensioned to have a work surface which measures about 4 feet×5 feet at a height of about 2.5 feet. An additional area (e.g. the first few inches of the table prior to the work surface) is provided for calibration and initialization along the X and Y axes. As will be explained in greater detail hereinafter, table 1 has associated therewith a plurality of optical sensor assemblies (designated 30 in FIG. 2) for sensing parameters in the X and Y directions and a stepper motor driven ball screw 2 for moving the sensor assemblies in the Y direction. Suitable indicia and/or raised stops (not shown) may be attached to the table top 4 to designate the location of the work surface and the desired placement of the workpiece 50. A calibration strip (also not shown) is attached to the table top 4 along the Y direction to provide position information to which the optical sensor assemblies are responsive.

The table 1 also includes a rectangular-shaped yoke 6 which is precisely aligned with the work surface and is mounted on roller bearings and twin ball bushing pillow blocks for movement in the Y direction across table top 4 by riding along a pair of rails 8 located at opposite sides of table 1. The calibration area of table 1 serves as the home position for yoke 6. Movement of the yoke 6 from its home position and along rails 8 is controlled by the ball screw 2. A reversible stepper motor 10 having a resolver is mounted at one end of the ball screw 2 to drive such screw. A screw threaded flange 12 at the bottom end of yoke 6 is interconnected with ball screw 2 under table 1. A rotation of the ball screw 2 through flange 12 causes a corresponding continuous linear movement of yoke 6, the direction of which movement being dependent upon the direction of rotation of ball screw 2.

The aforementioned optical sensor arrays and an associated light source (e.g. a light bar) 14 for illuminating the arrays are carried in spaced alignment with one another by the yoke 6. More particularly, the optical sensor arrays and respective light focusing lenses (designated 30 and 32 in FIG. 2) are mounted on the top bar of yoke 6, and the light source 14 is mounted at the bottom bar of the yoke. With the optical sensor arrays and light source 14 aligned with one another at opposite ends of yoke 6, table top 4 radiates light energy from the clear, light diffusing surface thereof to the sensor arrays. The workpiece 50, which is typically a flat, opaque piece of sheet metal with holes punched therethrough, is placed on the top 4 of table 1, such that the optical sensor arrays will detect the position and dimension of the holes in the X direction depending upon the light that is transmitted through such holes to the sensors of the arrays.

Therefore, as will be recognized by those skilled in the art, the light source and the optical sensor arrays of the presently disclosed invention are all moved in a single (i.e. Y axis) direction across a stationary workpiece 50, rather than otherwise moving the workpiece in a pair of perpendicular directions, as is common to conventional inspection systems. Accordingly, relatively complex and expensive motors and positioning apparatus necessary to move the workpiece in the conventional systems are advantageously avoided without diminishing the accuracy of the data received at the optical sensor arrays.

At each successive position to which the yoke 6 is moved in the Y direction along the inspection table 1, the control software and hardware (to be described in greater detail hereinafter when referring to FIGS. 3-6) will read the light/dark transition data detected from the optical sensor arrays. Briefly, however, data which is representative of the Y position of the yoke 6 and the X position of all transitions from light-to-dark and dark-to-light during each scan of the sensors is collected and transmitted to a microcomputer (designated 70 in FIG. 6). The microcomputer stores all of the data corresponding to the holes and the outside edges of the workpiece 50. Cumulative information corresponding to the X and Y position of all holes is transmitted from the microcomputer to a conventional column printer 15 or plotter 16 whenever an outer edge is detected (representative of the end of the workpiece 50). The microcomputer will also input commands and output status information to the system operator on the screen 18 of a video monitor mounted at the operator's control console 20. The output of the present system will be a list of X and Y coordinates of the center points of the holes relative to one corner of the workpiece, the outside edges of the workpieces, and the maximum width and length of each hole. A plot of the workpiece may also be drawn with all hole and workpiece dimensions illustrated.

The operator's control console 20 (to be described in greater detail when referring to FIG. 6) contains the controls for operating and monitoring the yoke 6. Such controls include the aforementioned microcomputer, printer 15 and video monitor screen 18 (having touch screen capability) as well as an audio speaker 21, a KILL button 22, a RESET button 24, a POWER light 25, and a READY light 26. When depressed, the KILL button 24 is depressed to re-energize the system after actuation of the KILL button. When the present inspection system is initially powered-up, the microcomputer will complete a series of diagnostic and self tests and then illuminate the READY light 26 to indicate that all initial test conditions have been satisfied. The system software will cause status information and a menu of available functions to be displayed at screen 18. The operator can select functions from the screen by touching particular menu areas. A speech synthesizer may also be located at the control console to announce to the operator, through the speaker 21, the status of the yoke and certain alarm conditions by which to gain the attention of the operator.

Figure 2:
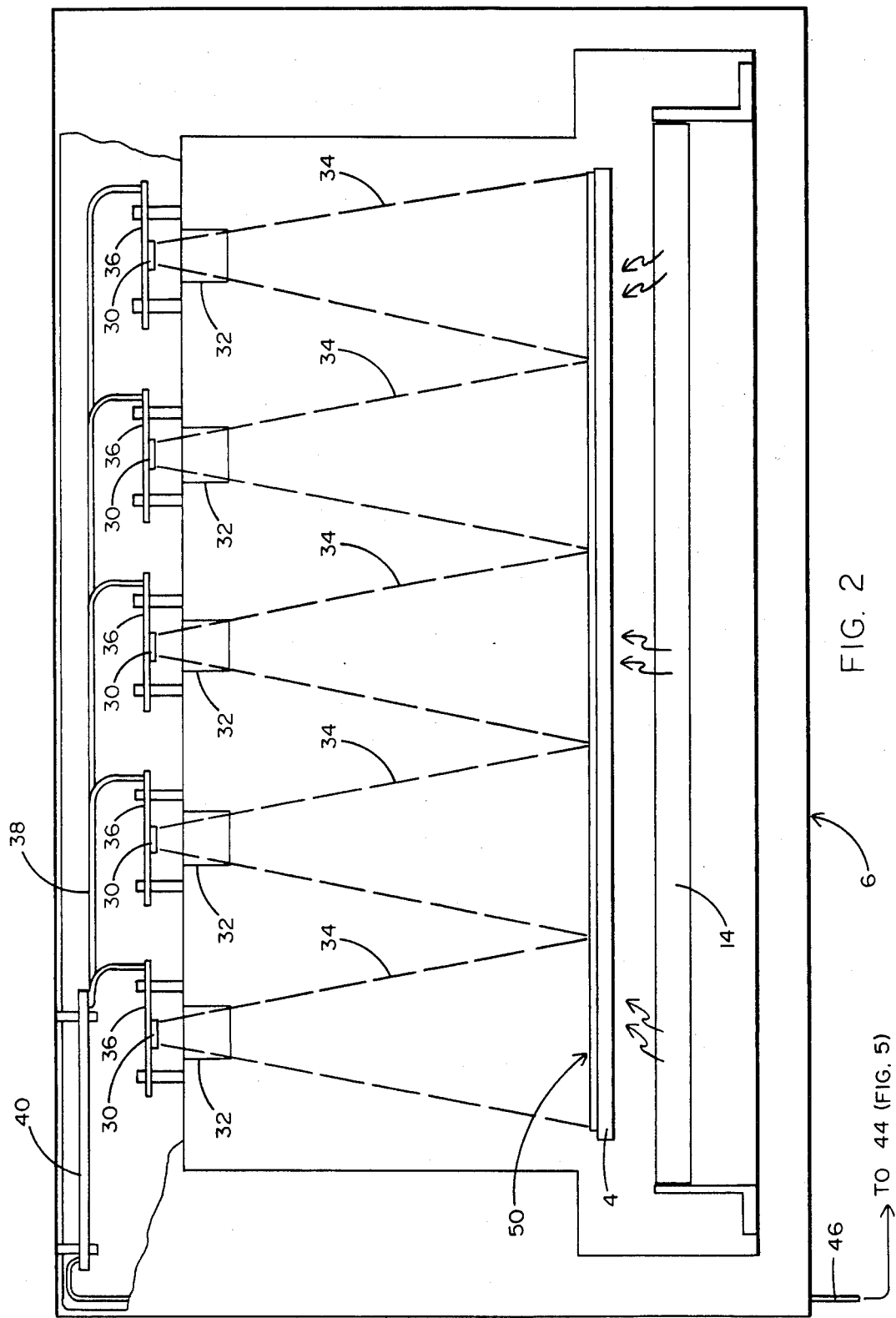
FIG. 2 is a plan view showing the movable yoke which is part of the inspection system of FIG. 1.

Referring now to FIG. 2 of the drawings, the yoke 6 is shown carrying the optical sensor arrays 30 and respective lenses 32 along the top bar thereof and the light source 14 along the opposite bottom bar. As previously disclosed, the light source 14 illuminates the optical sensor arrays 30 through the light diffusing, clear top 4 of inspection table 1 so that the presence of light and dark areas may be detected by sensor arrays 30 to indicate the presence and position of the holes in a workpiece. Each of the optical sensor arrays 30 is preferably a commercially available chip comprising 2,048 charge coupled devices (CCD). By way of example, a suitable chip for use herein is Model No. 2048G manufactured by EG & G Reticon of Sunnyvale, Calif. In the present embodiment, five such optical sensor arrays 30 are evenly spaced along the top of yoke 6, whereby a total of 10,240 pixels are utilized. However, it is to be understood that additional optical sensor arrays 30 can also be included at yoke 6 to increase resolution and narrow the field of view of each array. In the embodiment illustrated, the window areas of the optical sensor arrays 30 and their respective lenses 32 scan successive ten inch long line segments to form a complete scan line in the X direction across the top of workpiece 50. The respective line segments of workpiece 50 scanned by each of the five optical sensor arrays 30 of FIG. 2 is shown in phantom and represented by the reference numeral 34.

Each of the optical sensor arrays and associated clock logic to sequentially select the 2,048 charge coupled devices thereof form respective ones of five different detector interfaces 36. The operation of a detector interface will be explained in greater detail when referring to FIG. 3. Briefly, however, the associated clock logic of each of the five detector interfaces 36 generates six clock phases which sequentially access the CCDs of a respective optical sensor array 30 at a scan rate of 5.0 megapixels per second. The detector interface 36 provides differential output voltages from the CCDs which are compared with a predetermined fixed threshold set point reference voltage to determine whether the 5 mil square table surface area that is scanned by a particular charge coupled device from the 2,048 array of charge coupled devices is representative of an opaque solid (corresponding to the workpiece) or an open void (corresponding to a hole in the workpiece).

Each of the five detector interfaces 36 is interconnected by a common electrical cable 38 to a single video interface 40. The operation of the video interface will be explained in greater detail when referring to FIG. 4. Briefly, however, video interface 40 contains logic to multiplex analog output signals from the detector interfaces 36 into representative digital signals to be applied to a single computer interface (designated 44 in FIG. 5), whereby the charge coupled devices from all of the sensor arrays are sequentially read. In this manner, the five 2,048 CCD pixel arrays 30 will appear to the soon-to-be described computer interface of FIG. 5 as a single 10,240 pixel array.

The video interface 40 is connected to the computer interface 44 (of FIG. 5) by way of an electrical cable 46 whereby to provide the digital signals from video interface 40 to a microcomputer. Briefly, the computer interface 44 generates multiplexer control signals and clock pulses for controlling the operation of the video interface 40. The computer interface 44 also applies the predetermined set point reference voltage to a comparator to thereby compare such reference voltage to the voltages at the output of detector interface 36. The logic of computer interface 44 operates to compress the data received from video interface 40 by being responsive to only the data necessary for determining the position on the workpiece of a transition from dark-to-light or light-to-dark corresponding to the edge of a hole.

Figure 3:
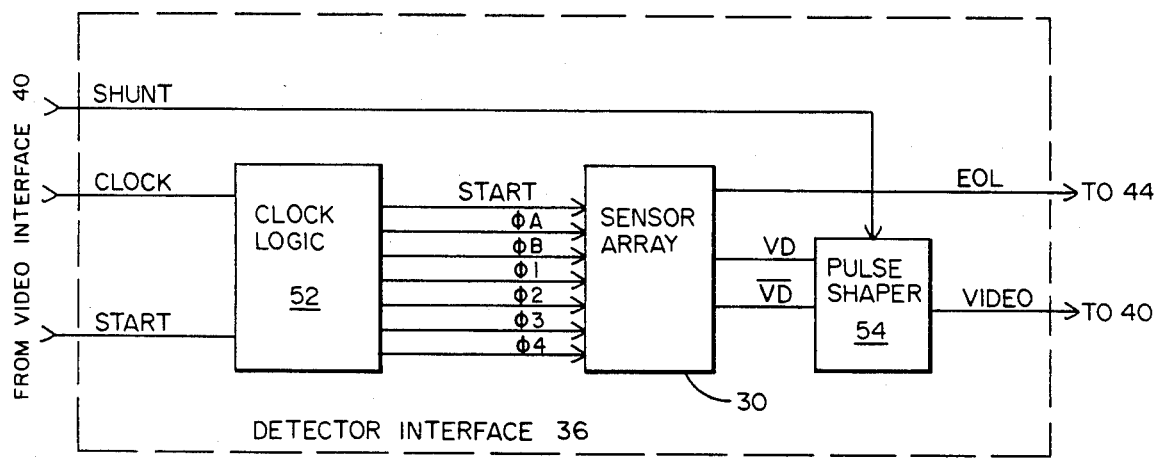
FIG. 3 is a block diagram of one of the five detector interfaces which are utilized to sense optical information corresponding to the position and dimensions of holes formed in a flat workpiece.
Figure 4:
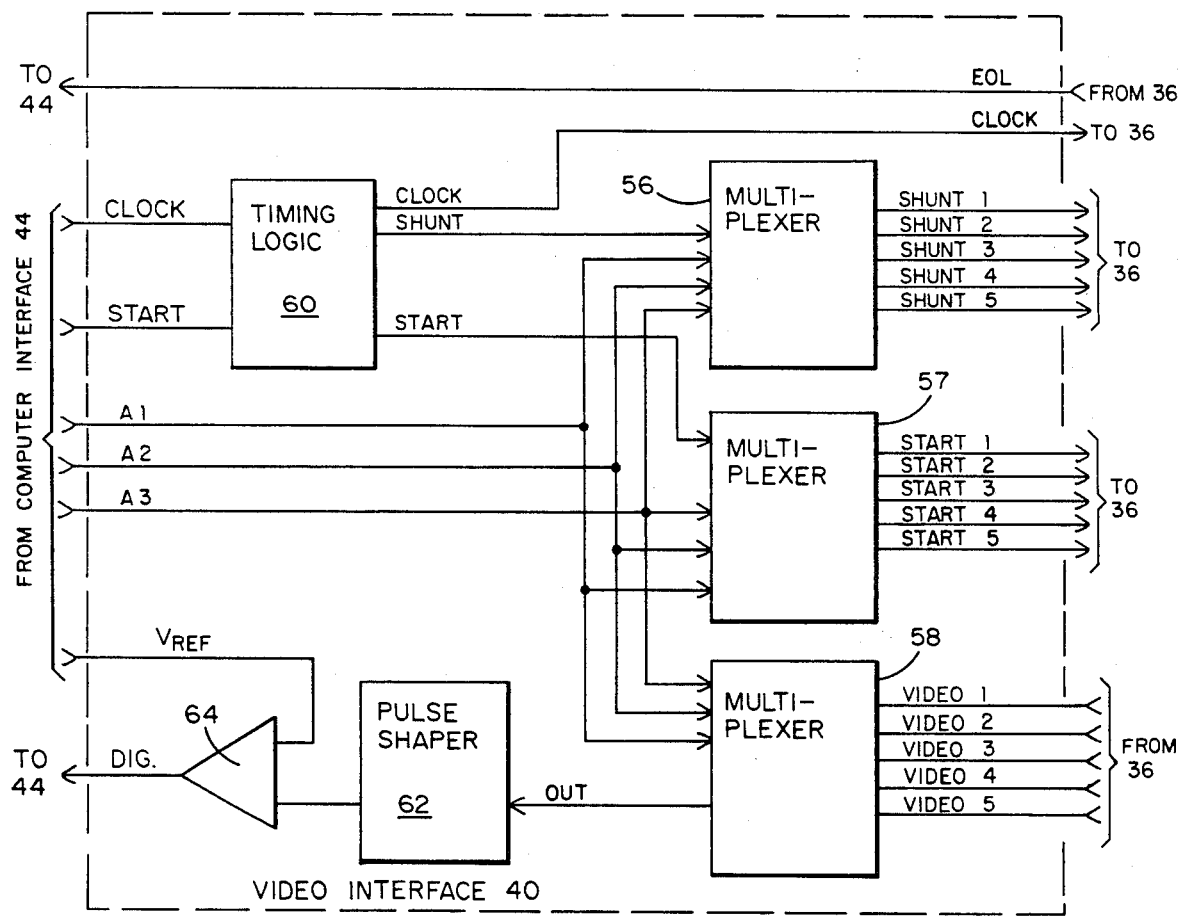
FIG. 4 is a block diagram of a video interface used for multiplexing analog output signals from the five detector interfaces of FIG. 3.
Figure 5:
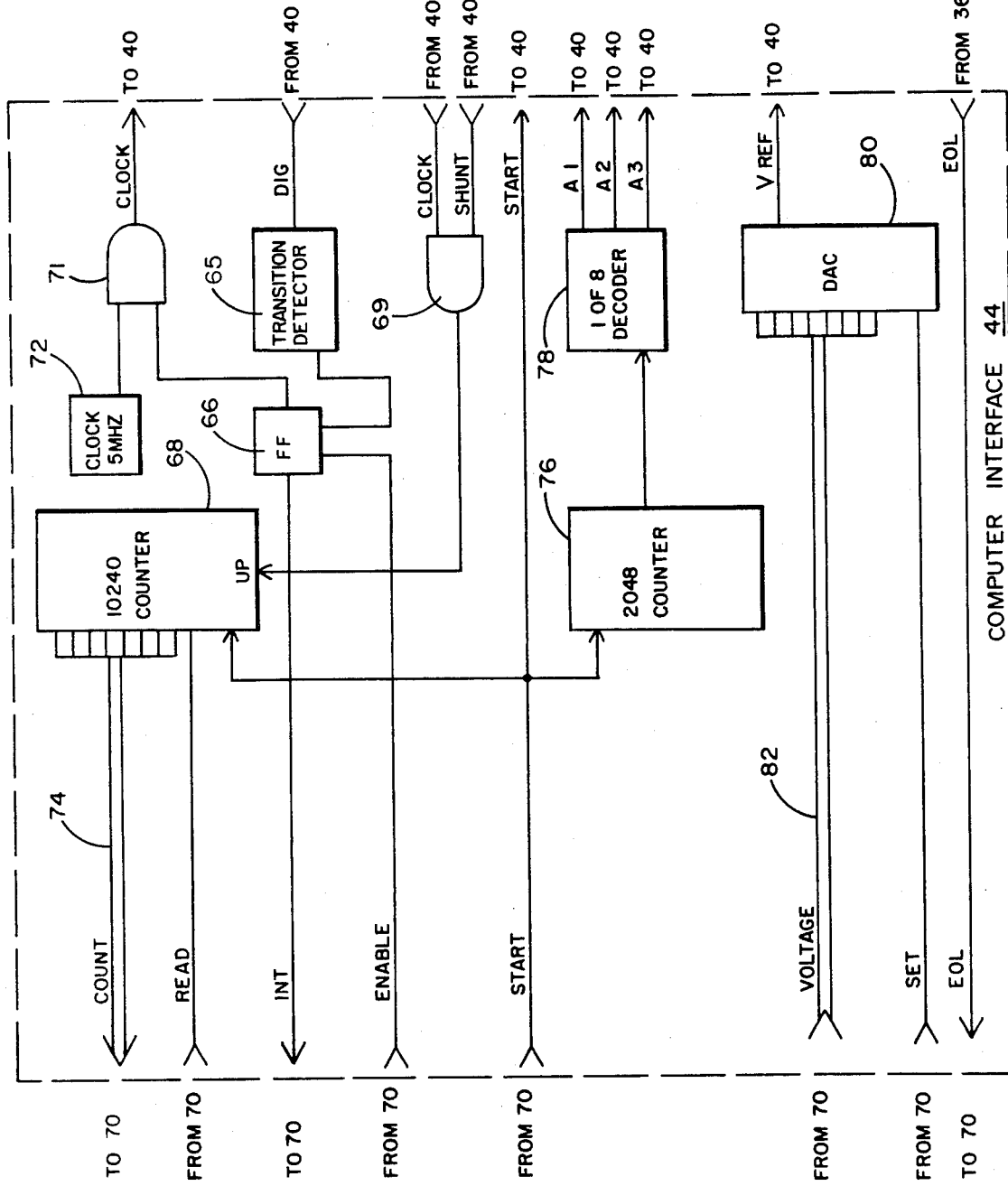
FIG. 5 is a block diagram of a computer interface utilized to permit a microcomputer to read digital output signals provided by the video interface of FIG. 4.

The particular details of the detector interface 36, video interface 40 and computer interface 44 are now disclosed while referring respectively to FIGS. 3, 4 and 5 of the drawings. In FIG. 3, there is shown a block diagram for one of the five identical detector interfaces 36 which include individual ones of the optical sensor arrays 30 (of FIG. 2). Each detector interface 36 includes conventional multiphase clock logic 52 which is connected to receive digital START and CLOCK enabling input signals from video interface 40. The output of clock logic 52 is six multiphase clock signals, designated $\phi_A$, $\phi_B$, $\phi_1$, $\phi_2$, $\phi_3$, and $\phi_4$, and the START input signal delayed in time. The multiphase clock and delayed START signals are applied from clock logic 52 to the associated optical sensor array 30, whereby to sequentially access the 2,048 CCD pixels thereof, and thereby select successive ones of the CCDs to be ultimately read by the microcomputer.

The outputs of the sensor arrays 30 are complementary pairs of video signals VD and $\overline{VD}$ (to reduce noise) which provide analog representations of the light intensity received by each of the CCDs of the array through holes formed in the workpiece. The analog output signals of the detector interface 36, designated VIDEO, are generated after a pulse shaper 54 receives and reshapes the output signals from array 30. An digital SHUNT pulse is controllably applied from video interface 40 to pulse shaper 54 to enable the VIDEO output signals to be serially generated to form a data stream. The VIDEO output signals from detector interface 36 are applied from pulse shaper 54 to the video interface 40. The sensor array 30 is also adapted to supply an additional output signal, designated EOL, at such time as when the last CCD pixel from the array of 2,048 pixels has been read.

In FIG. 4, there is shown a block diagram of the single video interface 40 to which the stream of analog output signals, designated VIDEO, from each of the five detector interfaces 36 is applied. More particularly, video interface 40 includes three multiplexers 56, 57 and 58 necessary to permit communication of the five detector interfaces 36 with the single video interface 40. Multiplexer 58 is connected to receive the analog output signals, designated VIDEO 1-VIDEO 5, generated by each of the pulse shapers 54 which form the five detector interfaces 36 (of FIG. 3). Each of the multiplexers 56, 57 and 58 also receives multiplexer select signals, designated A1, A2 and A3, from the computer interface 44 (of FIG. 5) so that the five detector interfaces 36 may be selected one at a time to cause the analog output signals therefrom to be received at video interface 40 for providing an indication of the light intensity received by the CCDs which form the optical sensor arrays 30.

A timing logic gate 60, which operates as a time delay, applies respective CLOCK and START timing pulses (supplied thereto from computer interface 44) to the clock logic 52 (of detector interface 36) and the multiplexer 57. Timing logic 60 also generates SHUNT timing pulses for application to the multiplexer 56. Multiplexer 56 supplies output control pulses, designated SHUNT 1-SHUNT 5, to selectively enable successive ones of the pulse shapers 54 which form each of the five detector interfaces 36. Multiplexer 57 supplies output control pulses, designated START 1-START 5, to selectively drive successive ones of the multiphase clock logic 52 which form each of the five detector interfaces 36. Multiplexer 58 supplies to a pulse shaper 62 a series of analog output signals designated OUT, which are indicative of light intensity pattern changes sensed by the CCD sensors from the respective arrays which form each of the five detector interfaces 36. The output of pulse shaper 62 is applied to one input terminal of a 2-input comparator 64. A predetermined reference voltage, $V_{REF}$, is applied from computer interface 44 to the second input terminal of comparator 64 so that the magnitude of the reference voltage can be compared to the magnitude of the analog input signal supplied from multiplexer 58 via pulse shaper 62.

The output of comparator 64, which functions in video interface 40 as an analog-to-digital converter, is a digital pulse, designated DIG, which will correspond to a logical 1 if the pulse shaper output is above the reference voltage (representative of an opaque area on the workpiece) or a logical 0 if the pulse shaper output is below the reference voltage (representative of a hole formed in the workpiece). The information provided by the comparator 64 is supplied to the computer interface 44.

In FIG. 5, there is shown a block diagram of the single computer interface 44 to which is applied the output digital signals, designated DIG, from the comparator 64 of video interface 40. More particularly, computer interface 44 includes a transition detector 65 which is triggered every time that the level of a DIG input signal changes from a logical 0 to 1 or from 1 to 0 (indicative of a pattern change from light-to-dark or dark-to-light). The output signal of transition detector 65 is applied to a flip-flop 66 which supplies an interrupt signal, designated INT, to the microcomputer (70 in FIG. 6) at the occurrence of each transition. At the same time that the interrupt signal is supplied to the microcomputer flip-flop 66 also supplies an output pulse to one terminal of a 2-input AND gate 71 by which a master clock 72 (connected to the second input terminal of AND gate 71) is disabled. At such times as when the master clock 72 is not disabled by flip-flop 66, clock control pulses, designated CLOCK, are supplied from the output terminal of AND gate 71 to the input of the timing logic 60 at the video interface 40 of FIG. 4, whereby to generate the multiphase clock signals for accessing the CCDs of the optical sensor arrays 30 of FIG. 3.

Computer interfaces 44 also includes a digital counter which counts to 10,240 (the total number of charge coupled devices from all of the five arrays of optical sensors) and keeps track of the one particular CCD pixel which is being accessed and read. Each count of the counter 68 corresponds to a different pixel and to a respective location on the workpiece in the X direction. The pixel count of counter 68 is sequentially augmented upon the receipt of a pixel read clock pulse from a 2-input AND gate 69. CLOCK (from the timing logic 60 of video interface 40) and SHUNT (from the multiplexer 56 of video interface 40) signals are applied to the respective input terminals of AND gate 69 to increase the count of counter 68 after the selection of each pixel. When the microcomputer 70 receives an interrupt signal INT from flip-flop 66 and the master clock 72 is disabled, a READ signal is generated by the microcomputer and applied to the counter 68. The particular pixel count of counter 68 at the time of each interrupt signal is supplied to and read by the microcomputer 70 by way of a 16-bit bus 74. Since the master clock 72 is disabled and the counter 68 is read only at the occurrence of a transition from light-to-dark or dark-to-light, the size of the data loaded into the microcomputer is compressed. A control signal, designated ENABLE, is supplied by the microcomputer 70 to reset flip-flop 66 and re-enable master clock 72 after the microcomputer has read the counter output on bus 74.

Computer interface 44 includes a second counter 76 which counts to 2,048, the total CCD pixel count from any one of the five arrays of optical sensors. Microcomputer 70 supplies a START pulse to each of the counters 68 and 76 as well as to timing logic 60 of video interface 40. The START pulse initializes the counters 68 and 76 and resets the counts thereof to 0 at the start of each new scan line across the workpiece. Counter 76 supplies an output pulse to a 1 of 8 decoder 78 every time that the count from counter 76 reaches 2,048 (signifying that the last CCD has been read from one of the optical sensor arrays 30). The decoder 78 provides multiplexer select signals, designated A1–A3, depending upon which of the sensor arrays have been read so that the multiplexers 56, 57 and 58 of FIG. 4 can be selectively operated to permit communication between video interface 40 and successive ones of the five detector interfaces 36. The counter 76 is repeatedly filled and emptied a total of five times (once for each of the sensor arrays 30) so that all of the CCD pixels may be sequentially accessed by the multiphase clock signals and read by the microcomputer 70.

The analog reference voltage, designated $V_{Ref}$, to be applied to the comparator 64 of video interface 40, is developed by a digital-to-analog converter 80. That is, a digital signal, designated SET, is applied from the microcomputer 70 to enable digital-to-analog converter 80. A particular digitally encoded signal, which is designated VOLTAGE and is representative of the predetermined reference voltage $V_{Ref}$, is also applied from microcomputer 70 to digital-to-analog converter 80 via an 8-bit bus 82. The analog output, $V_{Ref}$, of the digital-to-analog converter 80 is applied to the comparator 64 of video interface 40, as previously disclosed. Lastly, the end of line signal, EOL, is supplied from detector interface 36 to microcomputer 70. The end of line signal is generated to interrupt data storage in the microcomputer at the end of a scan line across the workpiece after all of the 10,240 pixels from the five sensor arrays have been sequentially accessed and the data therefrom has been read into the microcomputer 70. At this time, both of the counters 68 and 76 will be reset, and the yoke 6 (of FIG. 1) is advanced to a new position in the Y direction, so that the optical sensor arrays 30 which will inspect a new scan line across the workpiece can be again sequentially accessed and read by the microcomputer 70 in the manner described.

Figure 6:
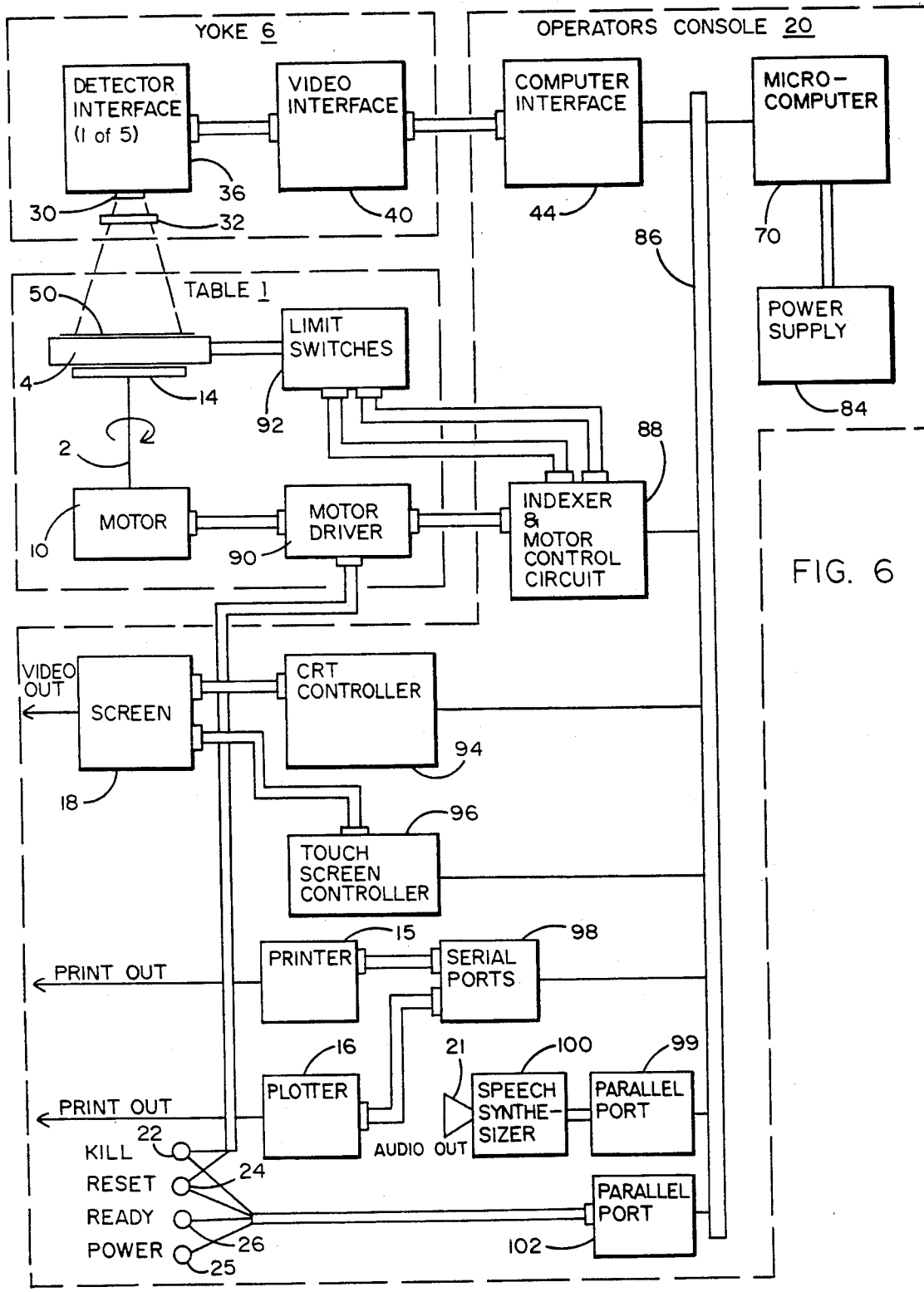
FIG. 6 is an overall block diagram of the inspection system which forms the present invention.

Referring now to FIG. 6, there is shown a block diagram for the overall automatic inspection system which forms the present invention. One suitable microcomputer 70 which may be used herein is an IBM Model AT. However, this example is not to be regarded as a limitation of the present invention, and other suitable computers may also be used. Microcomputer 70 and associated power supply 84 are located at the operator's console 20 (best illustrated in FIG. 1). The microcomputer 70 is electrically interfaced with the inspection table 1 and the movable yoke 6 by way of a computer micro bus 86. Computer bus 86 also permits the microcomputer 70 to communicate with the computer interface 44 so that data can be multiplexed from the plurality of optical sensor assemblies 30 at the five detector interfaces 36 and supplied to the single video interface 40.

Motor indexing and control circuitry 88 is connected between computer bus 86 and the stepper motor 12. The position of the yoke 6 in the Y direction is determined by the indexer circuitry 88 which counts the number of steps moved by stepper motor 10 for each new position of yoke 6. The count is read by the microcomputer 70 to provide hole dimensions in the Y direction. The motor 10 includes an associated Y axis drive 90 to control the motor and thereby cause the yoke 6 to move in a single direction across the surface of the workpiece 50. As previously indicated, the yoke 6 moves in a single direction along the Y axis of the inspection table for inspecting the holes in a stationary workpiece 50. In conventional systems, the workpiece is otherwise rotated or moved in at least a pair of perpendicularly aligned directions, usually by complex and expensive motor systems. The indexer and motor control circuitry 88 is also connected to a set of mechanical limit switches 92. The limit switches 92 are located at opposite ends of the table in the Y direction so as to disable the stepper motor 10 if the limits are exceeded, whereby to confine the movement of the yoke 6 to the boundary established by such switches.

As earlier indicated when referring to FIG. 1, the operator's console 20 includes a printer 15, and X-Y plotter 16 and a monitor having a touch operated screen 18. A conventional CRT controller circuit 94 is connected between computer bus 86 and screen 18 to control the flow of videographics and text between microcomputer 70 and the screen. The screen 18 is used as an output device to display status and as an input device to enter commands. The screen 18 will preferably be divided into a pair of sections for displaying the status and current mode of the system and for presenting a menu of functions and modes from which the operator may select. A conventional touch screen control circuit 96 is also connected between computer bus 86 and screen 18 to provide a touch screen capability so that the operator will be able to control the system by selecting particular menu items from the function and mode information displayed. The printer and plotter 15 and 16 are interconnected with computer bus 86 by way of two serial ports 98, so that a hard copy of the output data collected by microcomputer 70 is available.

A first parallel port 99 is connected between a speech synthesizer 100 and the computer bus 86. In this manner, data from microcomputer 70 may be audibly provided by means of the speaker 21 formed in the console 20. A second parallel port 102 is connected between computer bus 86 and the operator control switches and indicator lights 22, 24, 25 and 26 at the operator's console 20 to permit the microcomputer 70 to detect and indicate power-up and power-down conditions.

By virtue of the present invention, an economical, high speed inspection system is available for documenting and verifying on a CRT screen, an X-Y plotter and/or a column printer, the position and dimensions of all holes in a flat piece of metal. The present system is fully automatic and requires no operator-set-up time, thereby providing a significant savings of time compared with the traditional and time consuming manual approach of using height gauze, calipers and/or a tape measure to determine hole positions. Moreover, unlike other conventional systems, the metal workpiece remains stationary and only the sensor array and light source are moved in a single direction by means of the yoke. This avoids the relatively complex prior art inspection process of rotating and/or moving the workpiece in two perpendicular directions by motors and positioning detecting apparatus.

It will be apparent that while a preferred embodiment of the invention has been shown and described, various modifications and changes may be made without departing from the true spirit and scope of the invention. For example, although the present inspection system has been described with reference to holes in a flat sheet metal workpiece, it is to be understood that the present system has application for documenting and verifying the position and dimensions of holes made in any opaque workpiece, regardless of composition.

Having thus set forth a preferred embodiment of the present invention, what is claimed is:

1. A system for automatically inspecting a workpiece for holes formed therein, said system comprising;
   an inspection table having a transparent surface upon which the workpiece is to be laid;
   light source means;
   optical detector means; and
   means movable across said table in a first direction and retaining said light source means and said optical detector means in alignment with one another above and below said transparent table surface;
   said optical detector means extending across said table in a second, perpendicular direction relative to said first direction and being responsive to optical signals received from said light source means through said transparent table surface for providing an indication, depending upon the position of said movable retaining means, of the location in the workpiece of holes formed therein through which said optical signals are transmitted.

2. The inspection system recited in claim 1, wherein said movable means for retaining said light source means and said optical detector means in alignment with one another is a yoke which is movable in the first direction across said inspection table by a ball screw.

3. The inspection system recited in claim 2, wherein said yoke is slideable along the sides of said table, said yoke including upper and lower bars for carrying and retaining said light source means and said optical detector means in spaced opposing alignment with one another above and below the transparent table surface.

4. The inspection system recited in claim 1, wherein said optical detector means includes a plurality of optical sensor arrays responsive to optical signals transmitted by said light source means to respective scan areas along the workpiece, successive ones of said scan areas forming a continuous scan line in the second direction across said inspection table.

5. The inspection system recited in claim 4, wherein each of the optical sensors which forms the arrays thereof is a charge coupled device.

6. The inspection system recited in claim 4, further comprising means to detect the respective output signals of each of the optical sensors which forms the plurality of arrays thereof, and means for sequentially accessing different ones of said sensors so that the output signals thereof can be successively detected.

7. The inspection system recited in claim 6, wherein said means for sequentially accessing said sensors are clock means respectively associated with each of said optical sensor arrays for providing multiphase clock signals thereto.

8. The inspection system recited in claim 6, wherein said means for detecting the output signals of said optical sensors includes comparator means for comparing the output signal of each sequentially accessed optical sensor with a predetermined reference signal, the output signals from said comparator means being indicative of the presence or absence of holes formed in the workpiece.

9. The inspection system recited in claim 8, further comprising multiplexer means for supplying to said comparator means the respective output signals of each of said optical sensors which forms successive ones of said plurality of optical sensor arrays.

10. The inspection system recited in claim 8, further comprising counter means for assigning a different count to each one of the optical sensors being sequentially accessed and successively detected.

11. The inspection system recited in claim 10, further comprising computer means connected to said counter means and signal transition detection means connected between said computer means and said comparator means and being responsive to a change in the level of the output signal of said comparator means, said transition detection means causing said computer means to read the count of said counter means and thereby identify a corresponding optical sensor each time that the level of the output signal from said comparator means undergoes a particular change, each optical sensor identified by said counter means representing a location on said inspection table in the second direction.

12. A system for automatically inspecting a workpiece for holes formed therein, said system comprising:
an inspection surface upon which the workpiece is to be laid;
light source means;
optical detector means including a plurality of pixels extending across said inspection surface in a first direction, each pixel of said plurality being representative of a particular location on said inspection surface in said first direction; and
means movable across said inspection surface in a second, perpendicular direction relative to said first direction, said movable means carrying and retaining said light source means and said optical detector means in an aligment with one another such that optical signals are transmitted from said light source means to the pixels of said optical detector means by way of the workpiece, said pixels providing output signals which are indicative of hole locations in the workpiece in the first direction and the position of said movable means relative to said inspection surface being indicative of hole locations in the second, perpendicular direction.

13. The inspection system recited in claim 12, wherein said movable means is a yoke, said yoke having upper and lower bars for retaining said light source means and said optical detector means in spaced alignment with one another above and below said inspection surface.

14. The inspection system recited in claim 13, wherein said inspection surface is transparent to optical signals transmitted therethrough from said light source means to said optical detector means.

15. The inspection system recited in claim 13, wherein said yoke is moved in the second direction by a ball screw, said yoke being slideable along the sides of said inspection surface.

16. The inspection system recited in claim 12, further comprising comparator means for comparing successive ones of said pixel output signals with a predetermined reference signal, the output signals from said comparator means being indicative of the presence of holes in the workpiece.

17. The inspection system recited in claim 16, further comprising multiplexer means to supply successive ones of the output signals from said plurality of pixels to said comparator means.

18. The inspection system recited in claim 17, further comprising counter means to assign a different count to each one of the plurality of pixels when said multiplexer means supplies the respective output signal thereof to said comparator means.

19. The inspection system recited in claim 18, further comprising computer means and signal transition detection means connected between said computer means and said comparator means and being responsive to a change in the level of the output signal of said comparator means, said transition detection means causing said computer means to read the count of said counter means and thereby identify a corresponding pixel each time that the level of the output signal from said comparator means undergoes a particular change.

20. A system for automatically inspecting a workpiece for holes, said system comprising:
an inspection surface upon which the workpiece is laid;
light source means;
optical detector means having a plurality of sensors extending in an array across the work surface in a first direction;
means movable across the workpiece in a second, perpendicular direction, said movable means carrying and aligning said light source means and said optical detector means, such that each of said plurality of sensors receives optical signals transmitted from said light source means by way of said inspection surface,
comparator means for comparing the output signals of successive ones of said sensors with a reference signal, the magnitude of the output signal of said comparator means being indicative of holes formed in the workpiece;
level detector means responsive to changes in the magnitude of the output signal of said comparator means; and
means for identifying a corresponding sensor each time that said level detector means detects a particular change in the magnitude of said comparator means output signal;
the location of the identified sensor in said sensor array representing the position of a hole in the workpiece in the first direction and the location of said moving and carrying means representing the position of the hole in the second direction.

* * * * *